United States Patent [19]

Kado

[11] 4,356,966
[45] Nov. 2, 1982

[54] HEATER UNIT FOR AIR CONDITIONING SYSTEM FOR AUTOMOTIVE VEHICLES

[75] Inventor: Norio Kado, Konan, Japan
[73] Assignee: Diesel Kiki Co., Ltd., Tokyo, Japan
[21] Appl. No.: 204,608
[22] Filed: Nov. 6, 1980

[30] Foreign Application Priority Data

Nov. 17, 1979 [JP] Japan .......................... 54-159747[U]

[51] Int. Cl.³ .............................................. B60H 1/02
[52] U.S. Cl. ................................ 237/12.3 A; 98/2.08; 165/42
[58] Field of Search ............... 237/12.3 A; 98/2, 2.05, 98/2.06, 2.08; 165/35, 42

[56] References Cited

U.S. PATENT DOCUMENTS 4,227,569 10/1980 Wattin ............................ 237/12.3 A

FOREIGN PATENT DOCUMENTS 2742670 4/1979 Fed. Rep. of Germany ..... 237/12.3 A

*Primary Examiner*—Albert J. Makay
*Assistant Examiner*—Henry Bennett
*Attorney, Agent, or Firm*—Frishauf, Holtz, Goodman & Woodward

[57] ABSTRACT

A heater core is placed within a casing at a location substantially remote from an air inlet formed in a side wall of the casing. The heater core is arranged such that air introduced into the heater unit is guided to the underside of the heater core and then upwardly flows through it. An air-mix damper is supported on the heater core at a side facing the air inlet, with its free end arranged to be seated on the upper and lower edge surfaces of the air inlet so that it can be pivoted through a sufficiently large angle. The heater core and the air-mix damper have their walls cooperating with associated inner walls of the casing to define upper and lower air passages. Further defined in a zone immediately above the heater core is an air mixing chamber wherein cold air delivered through the upper air passage and warm air delivered through the lower air passage and the heater core are collided with each other at substantially right angles. An upper or face air outlet and a defroster air outlet which are connected to their respective air grilles provided in the instrument panel of an automotive vehicle associated with the air conditioning system.

8 Claims, 5 Drawing Figures

HEATER UNIT FOR AIR CONDITIONING SYSTEM FOR AUTOMOTIVE VEHICLES

BACKGROUND OF THE INVENTION

This invention relates to improvements in or to the construction of a heater unit for use in air conditioning systems for automotive vehicles.

Air conditioning systems for automotive vehicles in general include a type which comprises a cooler unit and a heater unit which are fabricated separately from each other, wherein air which is cooled by the operation of an evaporator arranged within the cooler unit or air which is supplied in a non-cooled state when the evaporator is at rest (outside air or inside or recirculated air) is introduced into the heater unit through an air inlet where it is heated by a heater core provided within the heater unit and then discharged through an upper or face air outlet or a floor air outlet both formed in the casing of the heater unit and then through a duct.

In such a heater unit, to obtain a desired discharge air temperature, the discharge air temperature is controlled by changing the angular position of an air-mix damper provided on the heater or in the vicinity thereof so as to change the mixture ratio of warm air passing through the heater core and cold air bypassing the heater core.

A conventional heater unit in general comprises a casing formed with an air inlet and various air outlets, a heater core disposed in the vicinity of the air inlet in such an arrangement that one side surface of the heater core cooperates with an inner wall surface of the casing to define a cold air passage therebetween, whereby air is guided to the upper side of the heater core and then downwardly flows through it, and an air-mix damper located within the cold air passage and pivoted at a point on the heater core for controlling the amount of air which is introduced into the heater core through the cold air passage. Warm air passing through the heater core and cold air passing through the cold air passage, i.e., bypassing the heater core can be mixed with each other in a zone downstream of the heater core.

The heater unit having the above-mentioned construction, however, has drawbacks that the cold air passage is inevitably small in space, resulting in large air flow resistance produced in the cold air passage, which leads to discharge of cold air into the passenger compartment at a limited flow rate, the presence of the air-mix damper within the cold air passage causes a substantial decrease in the space of the cold air passage, which further increases the air flow resistance in the passage, and the maximum pivotable angle range of the air-mix damper is so small that pivoting of the air-mix damper through a certain angle causes an abrupt and large change in the mixture ratio of cold air to warm air, thus making it difficult to carry out accurate and fine temperature control.

OBJECTS OF THE INVENTION

It is therefore an object of the invention to provide a heater unit for use in air conditioning systems for automotive vehicles, wherein the cold air passage is designed large in space, to thus reduce the air flow resistance in the passage for discharge of air into the passanger compartment at a sufficient flow rate, and the air-mix damper is designed large in size and allowed to make pivotal movement through a large maximum angle to thereby enable accurate and fine control of the mixture ratio of cold air to warm air.

It is a further object of the invention to provide a heater unit for use in air conditioning systems for automotive vehicles, wherein a cold air and warm air mixing chamber which is large in space is defined by an upper side surface of the heater core and inner wall surfaces of the casing, in which chamber warm air delivered through the heater core and cold air delivered through the cold air passage are collided with each other at substantially right angles to be mixed together to a sufficient extent.

It is a still further object of the invention to provide a heater unit for use in air conditioning systems for automotive vehicles, which is compact in size as a whole.

The above objects and other objects, features and advantages of the invention will be more apparent from the ensuing detailed description taken in connection with the accompanying drawings, in which:

DETAILED DESCRIPTION

Figure 1:
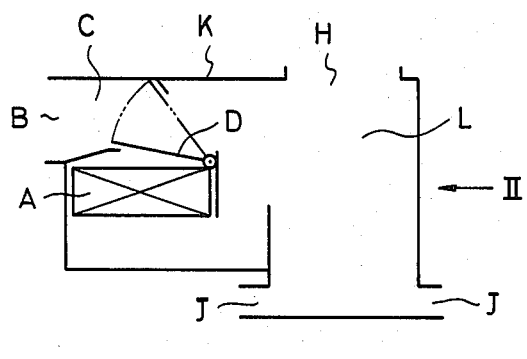
FIG. 1 is a schematic view showing the internal arrangement of a conventional heater unit.
Figure 2:
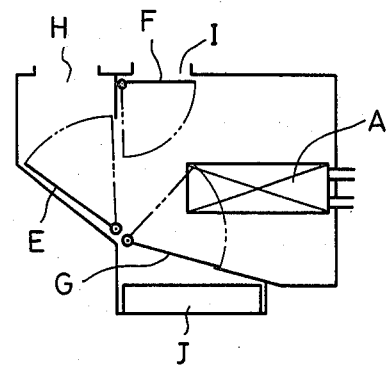
FIG. 2 is a view similar to FIG. 1, as viewed in the direction of the arrow II in FIG. 2.

FIGS. 1 and 2 illustrate as an example the internal arrangement of a conventional heater unit. A heater core A is horizontally disposed in the vicinity of an air inlet B formed in a side wall of a heater unit casing K. The heater core A has an upper side surface cooperating with an inner wall surface of the casing I to define a cold air passage C therebetween so that air introduced into the heater unit is guided to the upper side of the heater core A and downwardly flows through it. Arranged within this cold air passage C is an air-mix damper D which is pivoted at a point on the heater core A, the angular position of which determines the amount of air being delivered through the heater core A. Warm air which has passed through the heater core A and cold air which has passed through the cold air passage C while bypassing the heater core A are mixed with each other in a zone L so that mixture air having a controlled temperature is discharged through an upper or face air outlet H, a defroster air outlet I and a floor air outlet J depending, respectively, on the angular positions of a face air damper E, a defroster air damper F and a floor damper G which are formed in the casing K.

The above conventional arrangement has the disadvantages as previously noted that the cold air passage C is so small in space that particularly in cooler mode cold air flowing in the passage C undergoes high flow resistance, this flow resistance can further increases when the space in the cold air passage C is reduced by the presence of the air-mix damper D which then assumes an intermediate angular position, and the maximum pivotable range of the air-mix damper D is so small due to the narrow passage C so that even a small change in the angular position of the damper B causes an abrupt and large change in the mixture ratio of cold air to warm air, resulting in difficulties in carrying out discharge air temperature control.

Figure 3:
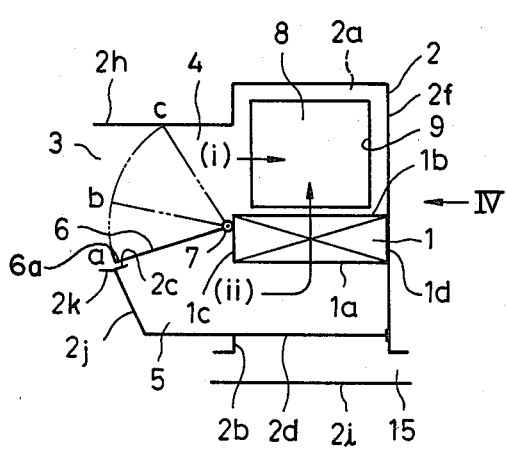
FIG. 3 is a schematic view showing the internal arrangement of a heater unit according to an embodiment of the present invention.
Figure 4:
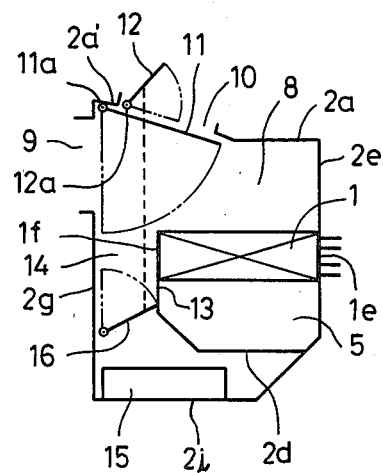
FIG. 4 is a view similar to FIG. 3, as viewed in the direction of the arrow IV in FIG. 3.
Figure 5:
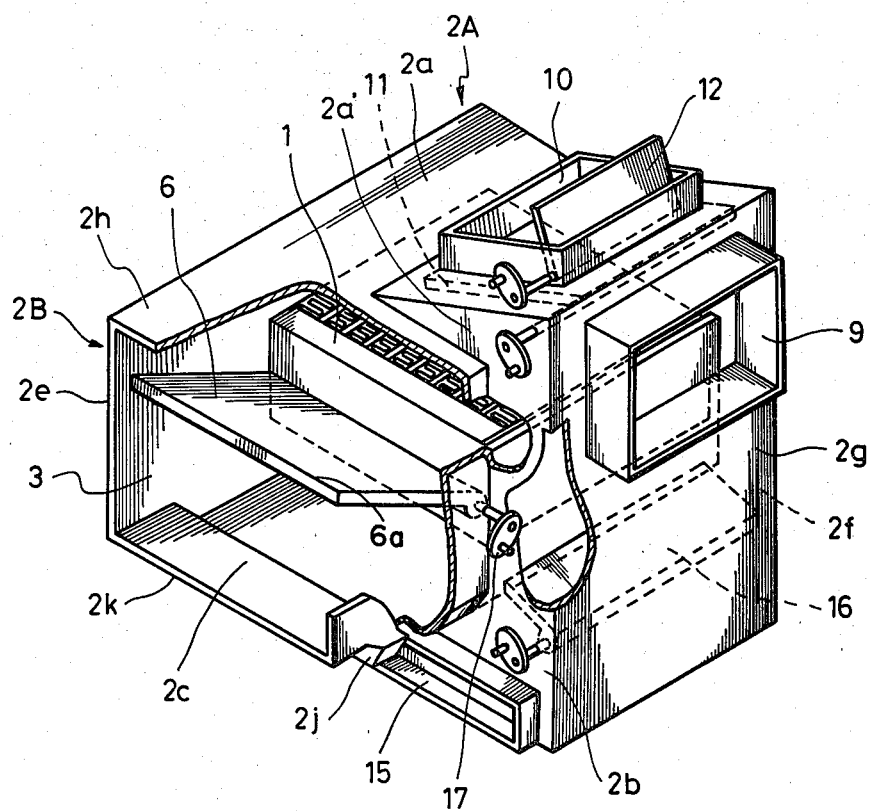
FIG. 5 is a perspective view showing the heater unit of FIG. 3 and FIG. 4.

FIGS. 3, 4 and 5 illustrate a heater unit according to the present invention. A casing 2 is formed of a substantially cubic box-shaped body 2A comprising an upper wall 2a, a rear side wall 2e, a front side wall 2g, a bottom wall 2i and right and left lateral side walls 2b, 2f. The lateral side wall 2b is formed with a laterally projecting tubular portion 2B which has a substantially rectangular cross section and which has a smaller cross sectional area than the size of the lateral side wall 2b. This laterally projecting tubular portion 2B extends laterally from the box-shaped body 2A at a location biased toward the upper wall 2a and the rear side wall 2e, and has an air inlet 3 formed in an end face thereof. A heater core 1 is horizontally disposed within the casing 2 on a line extending from the air inlet 3 and at a location substantially remote from the air inlet 3, with an air inlet side 1a downwardly directed and an air outlet side 1b upwardly directed. The heater core 1 has side walls 1d, 1e disposed in contact with inner surfaces of the lateral side wall 2f and rear side wall 2e, respectively. An air-mix damper 6, which has a length larger than that of the conventional damper D shown in FIG. 1, is pivotally mounted on a support 7 provided on a lateral side wall of the heater core 1 facing the air inlet 3 and extends toward the air inlet 3 for vertical pivoting about the support 7. The air-mix damper 6 is adapted to be operated for pivotal movement by means of an operating lever 17. The heater core 1 and the air-mix damper 6 cooperate with inner surfaces of associated walls, i.e., the walls of the projecting tubular portion 2B and the upper wall 2a, horizontal partition wall 2d, rear side wall 2e, and front side wall 2g of the casing 2 to define an upper air passage 4 which extends substantially horizontally from the air inlet 3 to an air mixing chamber 8, hereinafter referred to, and a lower air passage 5, which extends substantially horizontally from the air inlet 3 to a lower side of the heater unit 1. The air-mix damper 6 has a tip or free end 6a which is arranged to be seated on seating surfaces formed by an inner surface of the ceiling wall 2h of the box-shaped body 2B and an upper surface of an inward protuberance 2c which is protruded from the bottom wall 2K formed adjacent a vertical wall 2j of the box-shaped body 2B. The inner surface of the ceiling wall 2h and the upper surface of the inward protuberance 2c form the upper edge surface and lower edge surface of the air inlet 3, respectively. Thus, the maximum pivotable range of the air-mix damper 6 is determined by the vertical size of the air inlet 3. Since the vertical size of the air inlet 3 can be designed large enough for the air inlet 3 to occupy at least a greater part of the lateral side wall 2b of the casing 2 and the pivoting support 7 of the damper 6 is located at a substantially central portion between the ceiling wall 2a of the casing 2 and the horizontal partition 2d forming the bottom of the lower air passage 5, that is, at a location substantially corresponding to the vertical center of the lateral side wall 2d, the maximum pivotable range of the air-mix damper 6 can be set at a sufficiently large value to thereby enable to control the mixture ratio of air introduced into the passage 4 and air introduced into the passage 5 in an accurate and fine manner. As is clear from FIG. 3, the lower edge surface 2c of the air inlet 3 is located at a lower level than the free end of the air-mix damper 6 in its horizontal position. This permits setting of the maximum pivotable angle of the air-mix damper 6 at a large value, and enables smooth entry of intake air into the lower air passage 5.

With the above arrangement, when the air-mix damper 6 is in the maximum cooling position indicated by the solid line a in FIG. 3, air introduced into the casing 2 through the air inlet 3 is all guided into the upper air passage 4 while bypassing the heater core 1 and then travels through the passage 4 into the air mixing chamber 8. When the air-mix damper 6 is in the maximum heating position indicated by the chain line c in FIG. 3, air introduced through the air inlet 3 is all guided into the lower air passage 5 and to the lower side of the heater core 1 to flow through the heater core 1 upwardly thereof. When the damper 6 is in an intermediate position as indicated by the chain line b, air introduced through the inlet 3 is divided into two streams, one of which flows in the upper air passage 4 to be delivered into the air mixing chamber 8 which is detailed hereinafter, and the other flows in the lower air passage 5 and passes the heater core 1. In the air mixing chamber 8, the cold air passing through the passage 4 and the warm air passing through the passage 5 and heated by the heater core 1 are collided with each other at substantially right angles as indicated by the arrows (i) and (ii) in FIG. 3, to be sufficiently mixed together. Further, the air in the lower air passage 5 enters the heater core 1 through its lower side and upwardly flows therethrough, which smoothes the air flow through the heater core 1.

The air mixing chamber 8 is defined in a zone immediately above the heater core 1 by the upper side surface of the heater core 1 and associated inner surfaces of the ceiling wall 2a, rear side wall 2e, lateral side wall 2f and front side wall 2g of the casing 2. The chamber 8 directly communicates with the upper air passage 4. An upper or face air outlet 9 and a defroster air outlet 10 are formed in the front side wall 2g of the casing 2 and in the sloped portion 2a' of the ceiling wall 2a adjacent the front side wall 2g, respectively, which outlets both open in the air mixing chamber 8. A face air damper 11 and a defroster air damper 12 are provided for pivotal movement about supports 11a and 12a, respectively, for opening or closing their respective air outlets 9 and 10.

The face air damper 11 is arranged to open or close both the face air outlet 9 and the defroster air outlet 10 in a selective manner. In cooler mode, the face air damper 11 is in the position indicated by the solid line in FIG. 4 where it opens the face air outlet 9 while simultaneously closing the defroster air outlet 10.

The defroster air damper 12 has a longitudinal size or length shorter than the longitudinal size of the defroster air outlet 10 so as to close only part of the air outlet 10. Therefore, in heater mode where the damper 12 is in the position indicated by the chain line in FIG. 4, the defroster air outlet 10 is only partially closed so as to allow warm air to be blown out therethrough at a limited flow rate.

The horizontal partition wall 2d horizontally extends at a level lower than the bottom wall 2k of the laterally projecting portion 2B and joined to the rear side wall 2e and lateral side walls 2b, 2f of the casing 2. A floor air guide passage 14 is defined by a partition wall 13 vertically extending from the horizontal partition wall 2d and joined to the front side wall 1f of the heater core 1 and inner surfaces of the front side wall 2g, lateral walls 2b, 2f and bottom wall 2i of the casing 2. This guide passage 14 extends from the air mixing chamber 8 to a floor air outlet 15 opening in lower portions of the opposite lateral side walls 2b, 2f of the casing 2. A floor air damper 16 is provided to open or close the floor air guide passage 14, that is, eventually open or close the floor air outlet 15. This damper 16 is connected to the defroster air damper 12 by a link work, not shown, to be pivoted in unison with the damper 12.

The operation of the heater unit having the above-described arrangement according to the invention will be described. In face air discharge mode, as indicated by the respective solid lines in FIG. 4, the face air damper 11 is positioned for opening the upper or face air outlet 9 and simultaneously closing the defroster air outlet 10, while simultaneously the floor air damper 16 is positioned for closing the floor air guide passage 14. With these damper positions, air introduced into the casing 2 through the air inlet 3 is guided into the upper air passage 4 and then delivered therethrough into the air mixing chamber 8 to be hence blown into the passenger compartment through the face air outlet 9.

During this face air discharge mode, discharge air temperature can be controlled through pivoting of the air-mix damper 6 which can be operated by the control lever 17 within an intermediate position range including the position indicated by the chain line b in FIG. 3. Part of the suction air is guided into the lower air passage 5 to be delivered to the heater core 1 where it is heated by heat exchange, and the resulting warm air is fed into the air mixing chamber 8 where it is mixed with cold air supplied through the upper air passage 4 into a mixture having a suitably controlled temperature which is discharged through the face air outlet 9.

On the other hand, in heater mode, the dampers 11, 12 and 16 are set at the respective positions indicated by the chain lines in FIG. 4. The damper 11 closes the air outlet 9, the damper 12 partially closes the air outlet 10 and the damper 16 opens the passage 14, while simultaneously the air-mix damper 6 is set at the position indicated by the chain line c in FIG. 3 to close the upper air passage 4. With these damper positions, air introduced into the casing 2 through the air inlet 3 is guided to the heater core 1 through the lower air passage 5 to be heated by heat exchange action of the heater core 1 and delivered as warm air into the air mixing chamber 8. The warm air is then guided along the floor are guide passage 14 to be discharged through the floor air outlet 15 into the passenger compartment. During this mode, part of the warm air in the air mixing chamber 8 is discharged through the defroster air outlet 10. To adjust the discharge air temperature during this heater mode, the air-mix damper 6 can be pivotally shifted from the position c to any intermediate position including the position b of the damper 6 so that part of the suction air (cold air) is guided through the upper air passage 4 into the air mixing chamber 8 to be mixed with warm air which has been delivered through the lower air passage 5 and the heater core 1, and the resulting warm air having a suitably controlled temperature is guided through the floor air guide passage 14 and discharged through the floor air outlet 15.

In defroster mode, the face air damper 11 is shifted to the position indicated by the chain line in FIG. 4 to close the air outlet 9, while the defroster air damper 12 is shifted to the position indicated by the solid line in FIG. 4 to open the air outlet 10.

In bi-level mode, the dampers 11 and 16 are both shifted to the positions indicated by the respective chain lines for opening the air outlets 9 and 15, respectively, wherein cold air is discharged through the face air outlet 9 and warm air through the floor air outlet 15, respectively. That is, in this bi-level mode, the air-mix damper 6 is within the intermediate position range including the position b indicated by the chain line in FIG. 3 to allow part of suction air to be guided through the upper air passage 4 and an upper portion of the air mixing chamber 8 and then discharged through the face air outlet 9, while the remainder of the suction air is guided through the lower air passage 5 and the heater core 1 and the resulting warm air is guided through a lower portion of the air mixing chamber 8 and then collided against an inner surface of the front wall 2g of the casing 2 to be guided through the passage 14 and discharged through the floor air outlet 15. In this mode, since the face air outlet 8 and the floor air outlet 15 are both opened, cold air and warm air are not substantially mixed with each other but form a laminar flow in the air mixing chamber 8.

While a preferred embodiment has been described, variations thereto will occur to those skilled in the art within the scope of the present inventive concepts which are delineated by the following claims.

What is claimed is:

1. A heater unit for use in an air conditioning system for automotive vehicles. comprising:

a casing having a plurality of peripheral walls including a plurality of vertical walls, said casing having an air inlet formed in one of said vertical walls, said air inlet having an upper edge surface and a lower edge surface, and an upper or face air outlet formed in another one of said vertical walls, said casing further having a defroster air outlet and a flow air outlet formed in at least one of said peripheral walls;

a heater core horizontally disposed within said casing, said heater core being arranged on a line extending from said air inlet at a location substantially remote from said air inlet, said heater core defining a cold air and warm air mixing chamber in a zone immediately above said heater core in cooperation with associated inner wall surfaces of said casing, said upper or face air outlet and said defroster air outlet opening in said chamber, said heater core having a side wall facing said air inlet;

an air-mix damper vertically pivotally mounted to a support on said heater core at a side facing said air inlet, said air-mix damper extending from said heater core to said air inlet and having a free end disposed to be seated selectively on said upper edge surface and said lower edge surface of said air inlet, said lower edge surface of said air inlet being located at a level lower than said free end of said air-mix damper when said air-mix damper is in a horizontal position, said air-mix damper and said heater core defining an upper air passage and a lower air passage for guiding air introduced through said air inlet, in cooperation with associated inner wall surfaces of said casing, said upper air passage extending substantially horizontally from said air inlet to said air mixing chamber, said lower air passage extending from said air inlet to a lower side of said heater core to guide air introduced therein to enter said heater core through said lower side thereof and flow through said heater core upwardly thereof, whereby cold air delivered to said air mixing chamber through said upper air passage and warm air delivered to said air mixing chamber through said lower air passage and said heater core collide with each other at substantially right angles to be mixed together;

said air-mix damper being supported on said support on said heater core at a location substantially corresponding to the vertical center between an upper substantially horizontal wall defining an upper surface of said upper air passage and a lower substantially horizontal wall defining a lower surface of said lower air passage;

an air guide passage defined by said side wall of said heater core facing said air inlet and associated ones of said peripheral walls of said casing, said air guide passage extending from said air mixing chamber to said floor air outlet; and first, second and third dampers provided within said casing for opening or closing said upper or face air outlet, said defroster air outlet and said floor air outlet, respectively.

2. The heater unit as claimed in claim 1, wherein said peripheral walls of said casing includes a ceiling wall and a front side wall, said defroster air outlet being formed in said ceiling wall at a location adjacent said front side wall and arranged to be opened or closed by said first damper.

3. The heater unit as claimed in claim 1, wherein said second damper is arranged to close only part of said defroster air outlet, said second damper being connected to said third damper for pivotal movement in unison with said third damper, whereby when said third damper is in a position for opening said floor air outlet, said second damper is in a position for partially closing said defroster air outlet.

4. The heater unit as claimed in claim 1, wherein said one vertical wall includes a tubular projection having a substantially rectangular cross section and extending laterally therefrom, said tubular projection having an end face thereof formed with said air inlet, said tubular projection having a cross sectional area smaller than that of said one vertical wall.

5. The heater unit as claimed in claim 4, wherein said peripheral walls of said casing include a ceiling wall and a rear side wall, said tubular projection extending from said one vertical wall at a location biased toward said ceiling wall and said rear side wall of said casing.

6. The heater unit as claimed in any one of claims 1,2,3,4,6, or 8, including a partition wall vertically extending in front of said heater core to define said air guide passage between said partition wall and said associated peripheral walls of said casing.

7. A heater unit for use in an air conditioning system for automotive vehicles, which comprises:

(1) a casing comprising a box-shaped body having a ceiling wall, a rear side wall, a front side wall, a bottom wall and opposite lateral side walls and a tubular projection having a ceiling wall and a bottom wall and having a substantially rectangular cross section, said tubular projection extending laterally from one of said lateral side walls at a location biased toward said ceiling wall and rear side wall of said box-shaped body, said tubular projection having an air inlet formed in an end face thereof, said tubular projection having a cross sectional area smaller than that of said one lateral side wall, said ceiling wall having a defroster air outlet, said front side wall having an upper or face air outlet, said opposite lateral side walls having a floor air outlet opening in lower portions thereof;

(2) a heater core horizontally disposed within said casing, said heater core being arranged on a line extending from said air inlet of said tubular projection at a substantially vertically central portion of said one lateral side wall, said heater core having one side wall disposed in contact with said rear side wall of said casing and another side wall with the other lateral side wall of said casing, respectively, said heater core cooperating with said rear side wall, ceiling wall, front side wall and other lateral side wall of said casing to define a cold air and warm air mixing chamber in a zone immediately above said heater core, said upper or face air outlet and said defroster air outlet opening in said air mixing chamber;

(3) a horizontal partition member horizontally extending at a level at least lower than the of said bottom wall of said tubular projection and joined to at least said rear side wall and said other lateral side wall;

(4) a partition wall extending substantially vertically from said horizontal member and joined to said heater core at a side facing said air inlet, said vertical partition wall cooperating with said front side wall, bottom wall and opposite lateral side walls of said casing and said horizontal partition member to define an air guide passage communicating with said air mixing chamber, said floor air outlet opening in said air guide passage;

(5) an air-mix damper vertically pivotally mounted on said heater core at said side facing said air inlet and extending from said heater core into said lateral projection, said air-mix damper having a free end disposed to be seated on said ceiling wall and bottom wall of said tubular projection, said air-mix damper and said heater core cooperating with said tubular projection, said ceiling wall, said rear side wall, said horizontal partition member and said vertical partition wall to define an upper air passage and a lower air passage for guiding air introduced in through said air inlet, said upper air passage extending substantially horizontally from said air inlet to said air mixing chamber, said lower air passage extending from said air inlet to a lower side of said heater core to allow air introduced thereinto to flow through said heater core upwardly thereof, whereby cold air delivered to said air mixing chamber through said upper air passage and warm air delivered to said air mixing chamber through said lower air passage and said heater core collide with each other at substantially right angles to be mixed together;

(6) a first damper arranged to close selectively said upper or face air outlet and said defroster air outlet;

(7) a second damper arranged to close only part of said defroster air outlet; and (8) a third damper arranged to close said air guide passage.

8. The heater unit as claimed in claim 1, wherein said heater core is located adjacent a rear side wall of the casing.

* * * * *